United States Patent [19]

Whisler

[11] Patent Number: 5,465,329

[45] Date of Patent: Nov. 7, 1995

[54] METHOD AND APPARATUS FOR USING INTERCEPTED OPERATOR MESSAGES TO CONTROL ROBOTICS

[75] Inventor: John W. Whisler, Raleigh, N.C.

[73] Assignee: Alphatronix, Durham, N.C.

[21] Appl. No.: 534,132

[22] Filed: Jun. 6, 1990

[51] Int. Cl.$^6$ ................................................. G06F 13/00
[52] U.S. Cl. ......................... 395/438; 364/DIG. 1; 364/DIG. 2; 364/221; 364/921; 395/80; 395/894; 395/825; 369/32; 369/30
[58] Field of Search .................. 364/DIG. 1 MS Files, 364/DIG. 2 MS Files; 395/200, 325, 375, 600, 700, 800

[56] References Cited

U.S. PATENT DOCUMENTS

| | | | |
|---|---|---|---|
| 4,281,315 | 7/1981 | Bauer et al. | 364/DIG. 1 |
| 4,802,152 | 1/1989 | Markvoort et al. | 364/DIG. 2 |

Primary Examiner—Robert B. Harrell
Attorney, Agent, or Firm—Staas & Halsey

[57] ABSTRACT

Messages for an offline storage device having volumes of storage media mounted by a robot device, i.e., a jukebox, are transmitted from requestor processes to a robot control process using a general message format intended for directing messages to a human operator. An operator message interception process receives all messages in the general format and routes all properly formed messages to the robot control process. Messages not having predefined formats are routed to an operator message delivery process, or discarded if no messages need be sent to the operator. Using this technique, it is possible to add a jukebox-type offline storage unit to a computer system without any changes in the production of messages previously delivered to an operator. In addition, the same communication path can be used for transmitting instructions to the jukebox-type storage device to perform other types of operations, such as creating, copying, deleting and renaming files and controlling access to the volumes and the drive in the offline storage device.

3 Claims, 5 Drawing Sheets

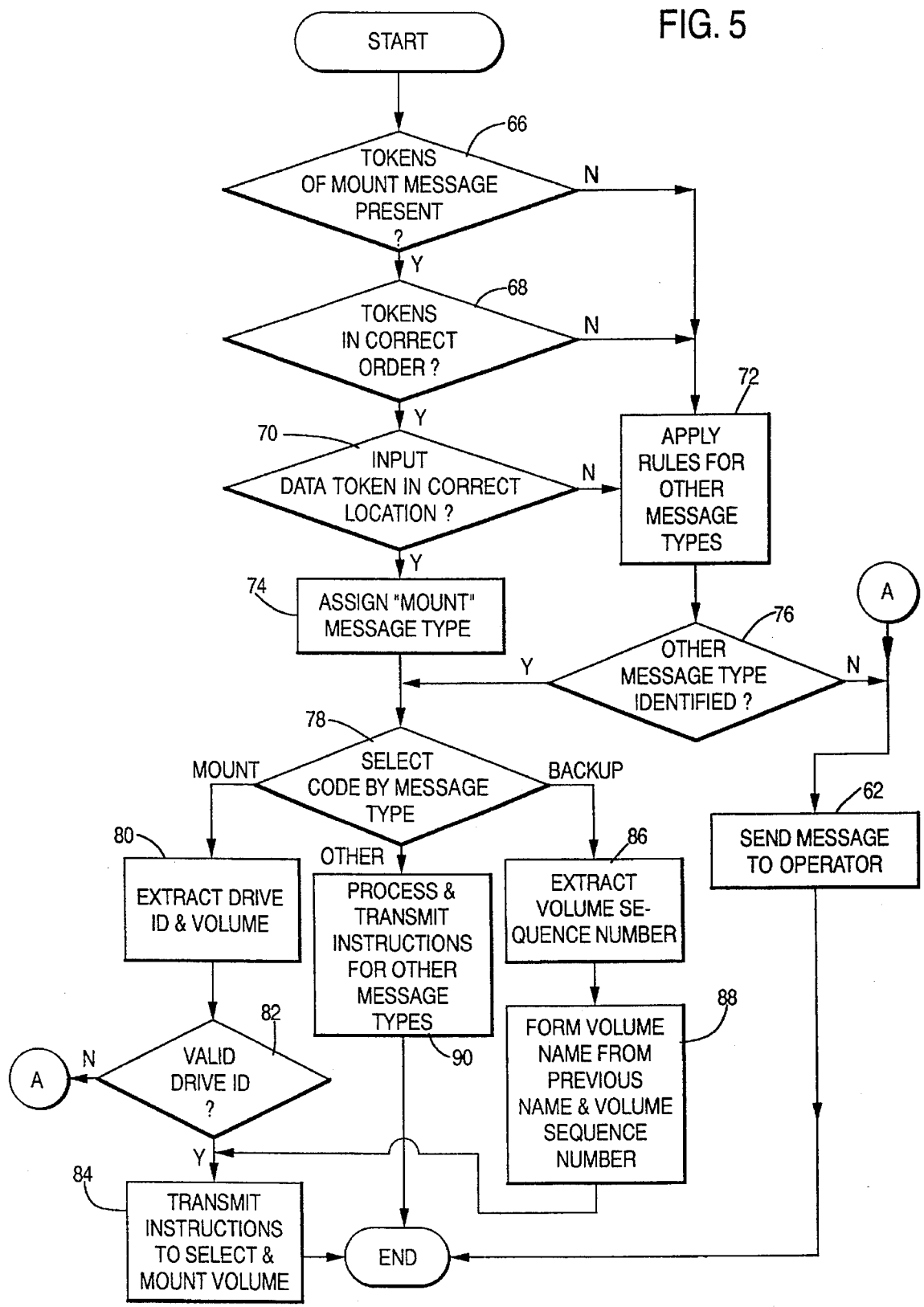

METHOD AND APPARATUS FOR USING INTERCEPTED OPERATOR MESSAGES TO CONTROL ROBOTICS

BACKGROUND OF THE INVENTION

1. Field of the Invention

The present invention is directed to communication between processes executing in a computer system and, more particularly, to transmitting commands to a robot control process which controls automatically performed operations similar to those previously performed by a human operator.

2. Description of the Related Art

Virtually all general purpose computer systems have some form of off-line storage for infrequently used or backup data. The most commonly used storage media for this purpose in the last 20 to 30 years has been magnetic tape due to its relatively low cost. In most systems, there is at least one tape drive which usually requires a human operator to mount the tapes to be used. Usually, this operation is prompted by requests from a program executing on the computer which, are displayed at the operator's console. Some computer systems use removable disks instead of tapes, but the operations are similar.

There have been several attempts to mechanize the process of mounting tapes or other storage media which is commonly performed by a human operator. For example, the IBM 3480 was a data storage device containing a number of small tape reels and an apparatus which operated like a jukebox to mount one of the tape reels on a drive contained in the IBM 3480 apparatus. Similar devices from other manufacturers using tape or more commonly disk-shaped media are currently being offered by several companies, including Perceptics (subsidiary of Westinghouse), Hewlett-Packard, Cygnet, MTI, Pinnacle, and Epoch. These devices typically require unique commands to control the device. As a result, existing software which relies upon the intervention of a human operator must be rewritten to use the unique commands of the particular device. This has a significant effect upon the ease with which these "jukebox-type" devices can be used to replace existing applications requiring mounting and dismounting of storage media, such as in backup operations.

SUMMARY OF THE INVENTION

An object of the present invention is to provide a method for communicating between processes in a computer system using a message format directed to an operator of the computer system.

A further object of the present invention is to use a message format directed to an operator of a computer system to provide instructions to a process controlling access to a data storage device.

Yet another object of the present invention is to automate the mounting and dismounting of offline storage media.

A yet further object of the present invention is to simplify the use of jukebox devices in a computer system, particularly for backup operations.

The above objects are attained by providing a method of communicating between first and second processes in a computer system, comprising the steps of: transmitting a message from the first process in a general format directed to an operator of the computer system; comparing all messages, transmitted in the general format to the operator, with at least one predefined message format; and transmitting all messages matching the predefined message format to the second process. All messages not matching the predefined message format may be passed on to the operator. In the preferred embodiment, the second process controls a media changing device, such as a robot control process for a jukebox device.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 5 is a flowchart of details in the operator message interception process.

DESCRIPTION OF THE PREFERRED EMBODIMENT

Figure 1:
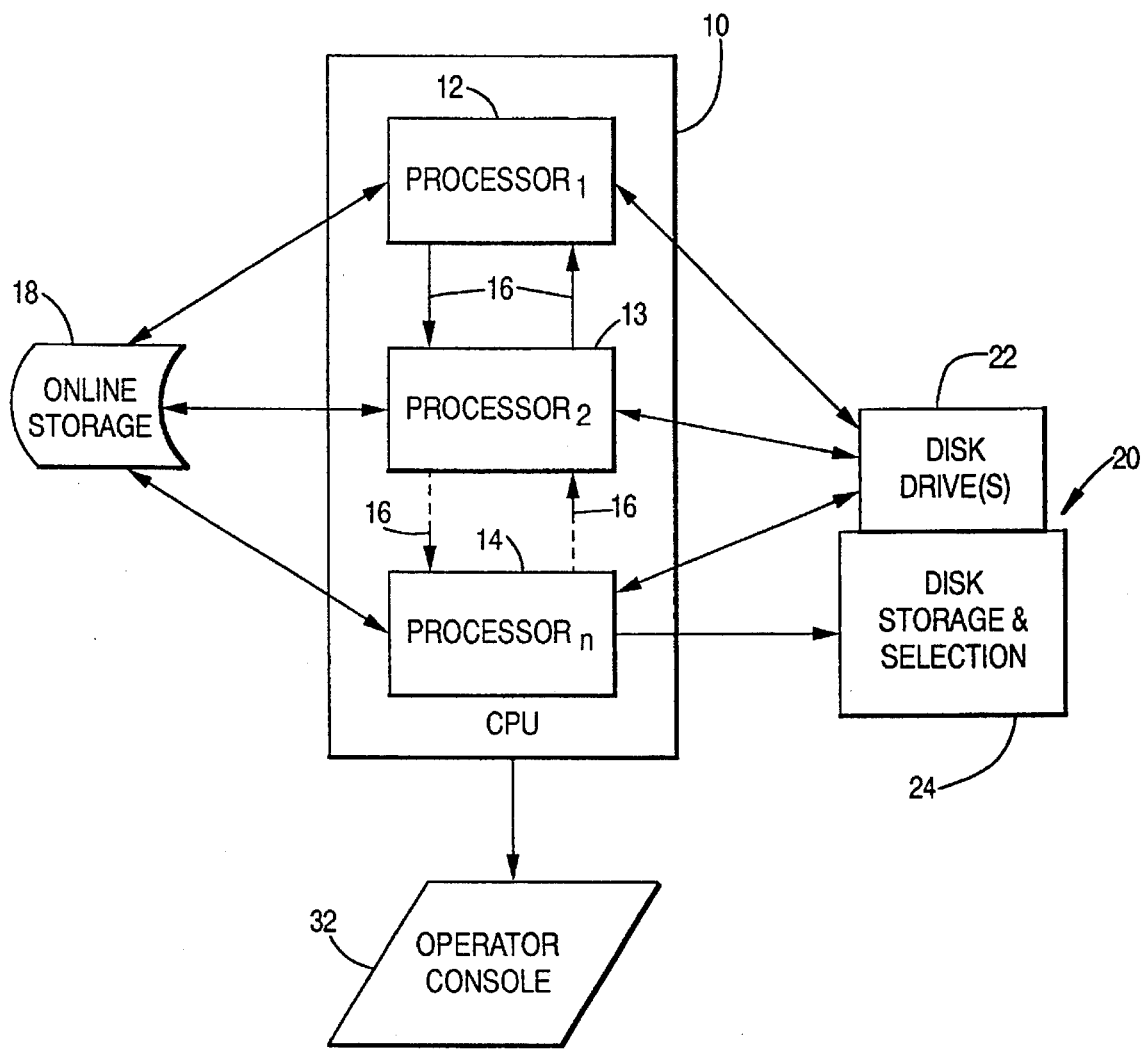
FIG. 1 is a block diagram of a computer system to which the present invention can be applied.

An example of a typical computer system which might use the present invention is illustrated in FIG. 1. The present invention is likely to be used in a multiprocessing, multitasking or at least timesharing system. A multiprocessor environment is illustrated in FIG. 1 as an example of a physical representation of multiple programs executing in a CPU 10. Three processors 12–14 are illustrated in FIG. 1 representing the n (typically 2 to 16) processors in a multiprocessor system. The processors can communicate to each other via a bus 16 or online storage 18 which may be semiconductor memory or disk files.

In a computer system to which the present invention has been applied, offline storage in the form of e.g., an optical read/write disk drive jukebox 20, is also connected to the CPU 10. The disk drive jukebox 20 includes one or more disk drives 22 and a disk storage and selection unit 24. The disk selection mechanism in unit 24 is controlled by, e.g., processor 14, in the CPU 10, assuming that the robot control process executing in the CPU 10 is in processor 14. Any of the processors 12–14 or, in the case of a single processor timesharing system, programs executing in the CPU 10 may access the data available on the disk drive(s) 22 as a result of the selection of a disk from the collection in the disk storage and selection unit 24.

Currently available jukebox devices 20 have room in the disk storage section 24 for 10 to 200 disks and 1 to 6 disk drives 22. The data stored on the disks in such devices is typically similar to the type of data stored on tapes in many computer installations. One example of "offline" data is reference data that is used relatively infrequently, e.g., no more than once a day, such as accounting data from previous reporting periods, digitized photographs or documents, medical records, insurance claims, etc. Another example is bulky data which is impractical to store on continuously online disks. Examples of bulky data include raw oil exploration data, satellite imaging data and extremely large databases of all sorts. Also, as mentioned above, backup copies of the contents of online storage 18 may be stored on the disks in the jukebox device 20 when a computer system includes this type of offline storage.

To access the 10 to 200 disks in the jukebox 20, commands must be transmitted from the CPU 10 to the disk storage and selection unit 24. For example, a program executing in processor 12 may want to access two month old accounting data. Assuming that the program for controlling disk selection is executing in processor 14, the disk being requested needs to be communicated to processor 14. If there is only a single processor, the need for communication remains since the requesting program and disk selection control program execute separately at different times.

Figure 2:
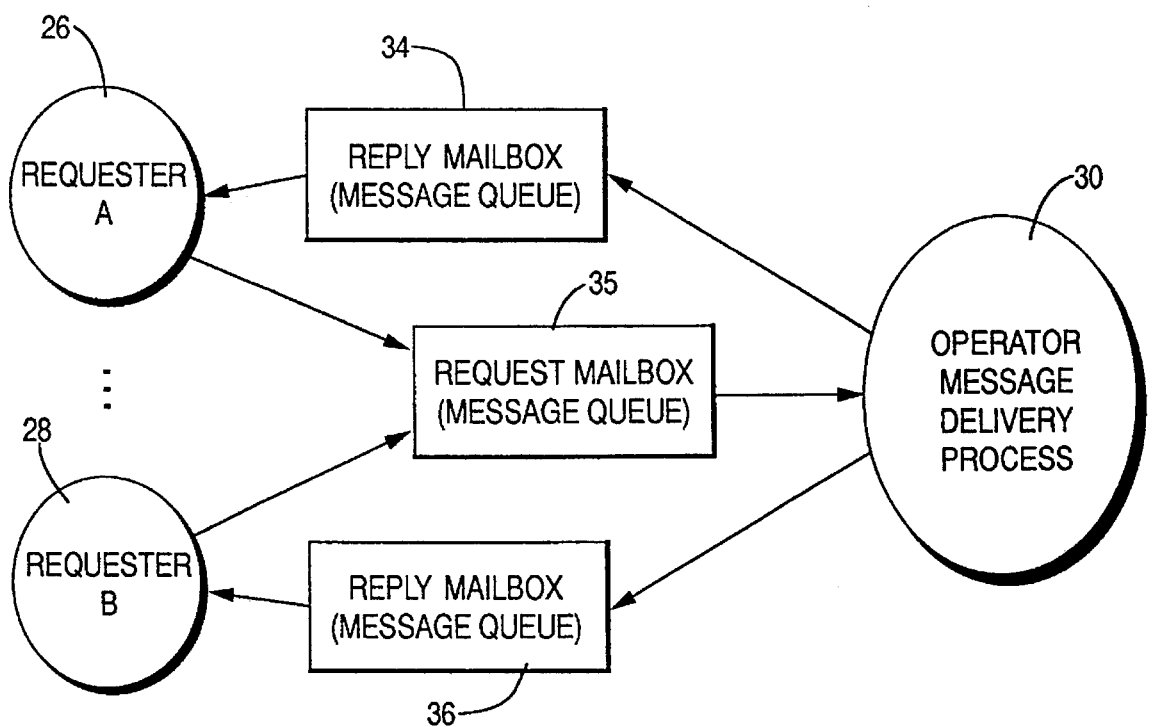
FIG. 2 is a block diagram illustrating how operator messages are transmitted in a prior art system.

In most minicomputers and mainframe computers, there is a mechanism for communicating with the human operator of the system. This method of communication is typically used for instructing the operator to mount tapes that are required by a program. In the DEC VAX VMS operating system, communication with the operator is accomplished by what are termed mailboxes. A mailbox is a defined amount of memory that is set aside for each process or program to receive messages from other processes or programs. A process in VMS is a program which continuously operates, constantly checking for messages in its mailbox or for some other stimuli. A program of this type is termed a "demon" in UNIX. The mailboxes operate on a first in/first out (FIFO) basis. As illustrated in FIG. 2, communication is between requesters 26, 28 and a process 30 which delivers operator messages to an operator console 32 (FIG. 1) using mailboxes 34–36. As indicated in FIG. 2, messages from the requestor programs 26, 28 are stored in request mailbox 35 for the operator message delivery process 30. The messages in the request mailbox 35 are read by the operator message delivery process 30 and output to the operator console 32. If a reply is requested, the reply is sent from the operator message delivery process 30 to one of the reply mailboxes 34, 36. The requestor programs 26, 28 read the reply mailboxes 34, 36, respectively.

While mailboxes are used in DEC's VMS, other structures are used in other operating systems. For example, in UNIX, a similar mechanism, termed a message queue, is used to communicate between processes and programs. A message queue is a linked list, rather than a defined region in memory. Other operating systems may use variations of either technique. In the case of both VMS and UNIX, the request indicates if a reply is required. In some operating systems, one or more centralized mailboxes or message queues may be used with the ID being written by the transmitting process or program and read by the receiving process or program to identify a message directed thereto.

Figure 3:
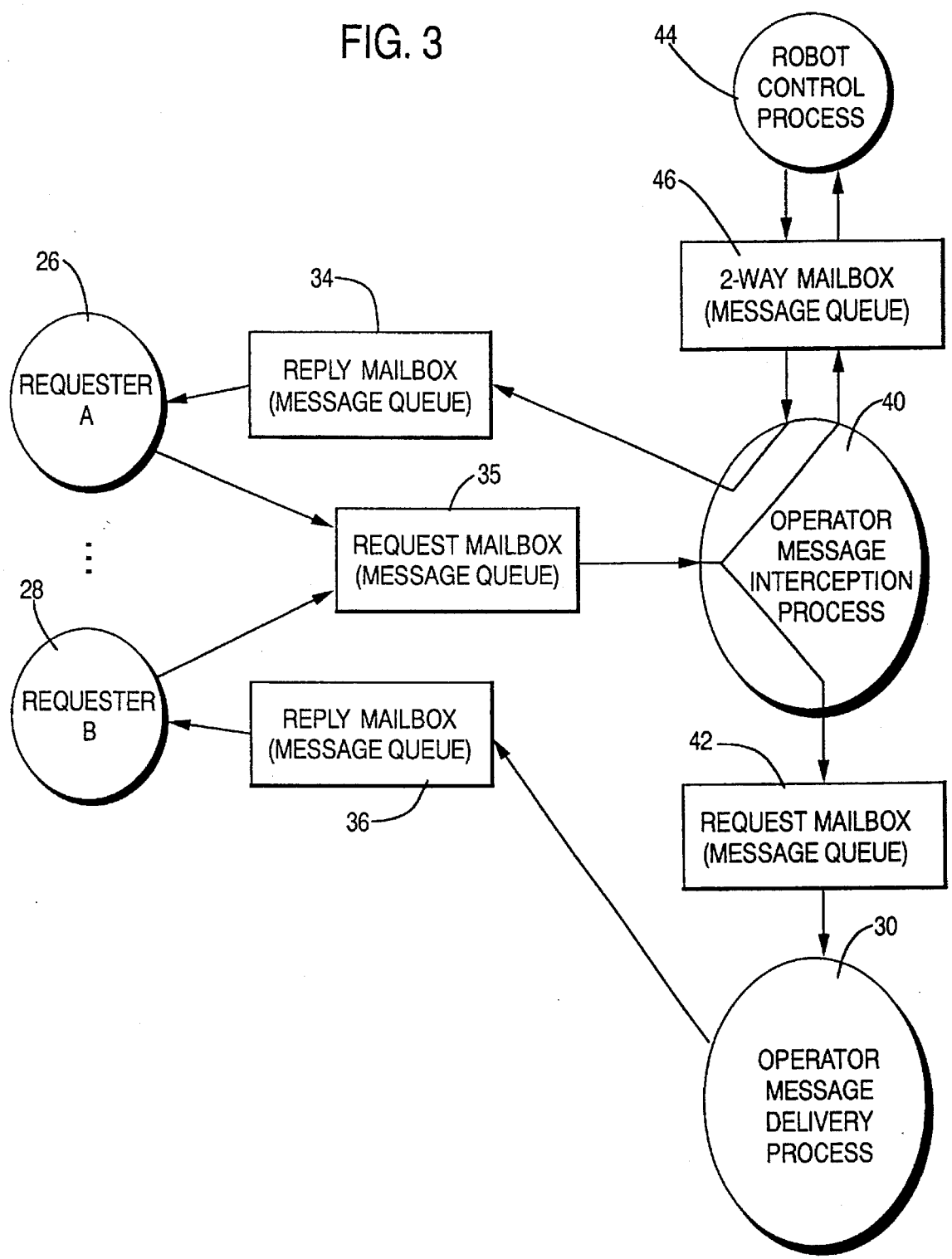
FIG. 3 is a block diagram illustrating how the operator message format is used to communicate with a robot control process according to the present invention.

The conventional system illustrated in FIG. 2 is modified as illustrated in FIG. 3 to accomplish the objectives of the present invention. The same operator message format is used in sending requests to the operator message delivery process 30 as in the conventional method illustrated in FIG. 2. However, instead of the operator message delivery process 30 reading the messages from the requester programs 26, 28 in the request mailbox 35, the messages in the request mailbox 35 are read by an operator message interception process 40 and actual operator messages may be passed to the operator message delivery process 30 via mailbox 42.

The operator message interception process 40 compares all of the messages transmitted in the general format directed to the operator message delivery process 30, with at least one predefined message format. The predefined message format(s) contain keywords, etc. which identify an instruction for a robot control process 44, executing in, e.g., processor 14, to control the disk storage and selection unit 24. All messages matching the predefined message format(s) are sent to the robot control process 44 by the operator message interception process 40 via a mailbox 46. In FIG. 3, mailbox 46 is illustrated as a two-way mailbox to enable the replies from the robot control process 44 to be transmitted to the requesting program. All of the messages in the general format of messages directed to the operator are intercepted by the operator message interception process 40. Those messages which do not match any of the predefined message format(s) may be passed on to the operator message delivery process 30 via mailbox 42 or, if desired, these messages may be discarded and the mailbox 42 and process 30 deleted from the system. If the messages are discarded, an error or other reply may be sent to the requester program.

Assuming some messages are to be sent to an operator, e.g., for the purpose of mounting tapes, etc., two consecutive requests, one from requestor A 26 and the other from requestor B 28, may be output as illustrated in FIG. 3. The requests would be sent to the request mailbox 35. The message from requestor A 26 will be assumed to match a predefined message format during processing in the operator message interception process 40, while the message from requestor B 28 will be assumed to not match a predefined message format. As described below in more detail, the message from requestor A 26 will trigger the transmission of instructions to the robot control process 44 to perform the requested action and if a reply is requested, it will be transmitted via two-way mailbox 46 to the operator message interception process 40 and finally to the reply mailbox 34 for requestor A 26. Meanwhile, the true operator message will be transmitted via request mailbox 42 to the operator message delivery process 30 and the operator's reply will be transmitted to requestor B 28 via its reply mailbox 36.

Figure 4:
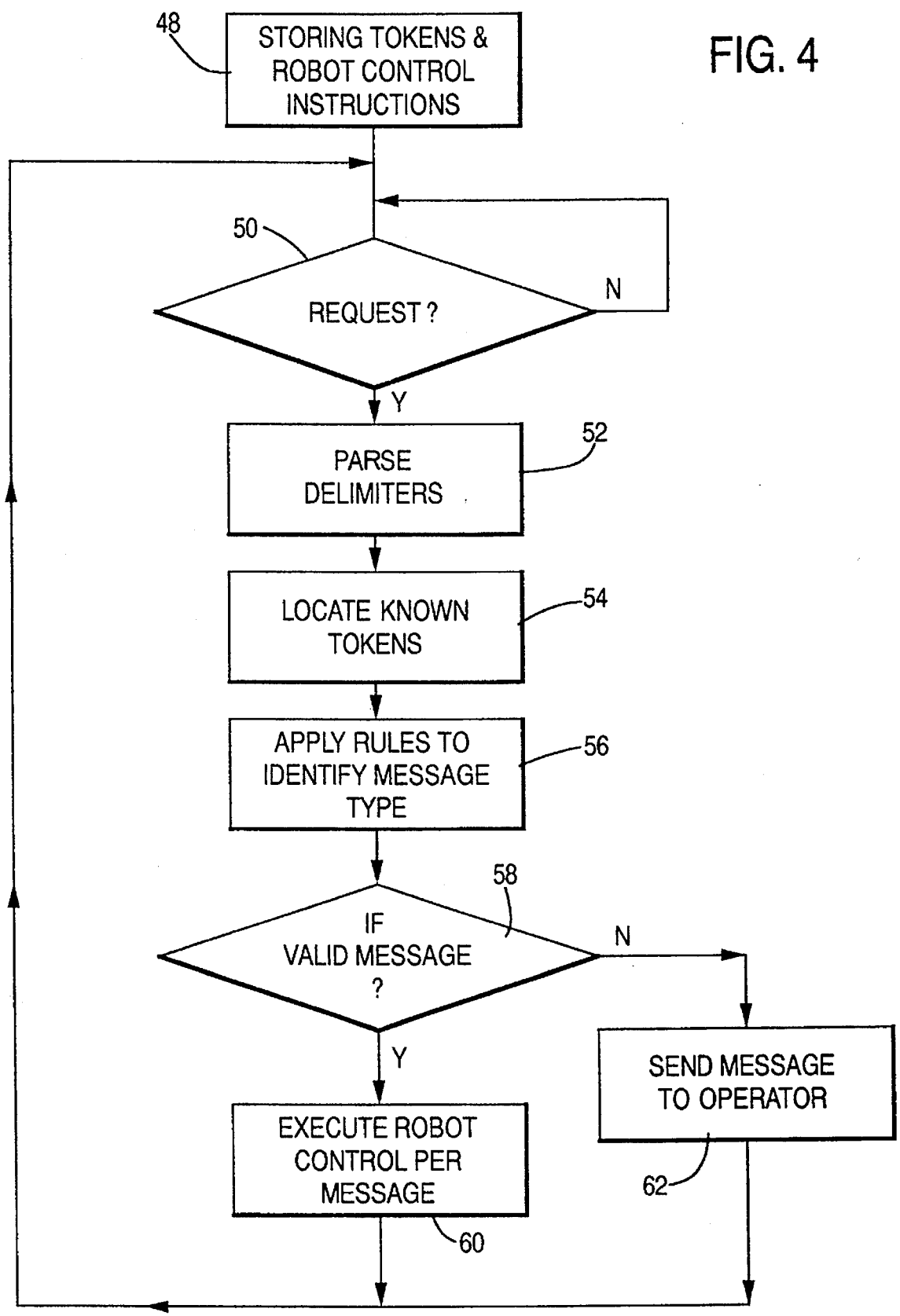
FIG. 4 is a flowchart of the operator message interception process.

A flowchart of the operator message interception process 40 is illustrated in FIG. 4. Sets of instructions for the robot control process 44 are stored prior to beginning operation of the computer system. As noted above, a VMS processor or UNIX demon is repeatedly looking 50 for a request in request mailbox 35. When a message is received from the request mailbox 35, the message is parsed 52 for delimiters such as spaces, slashes, equal signs, etc. The text between such delimiters will be referred to as "tokens" which are output by the parsing process 52. These tokens are then compared with a list of tokens used to control the robot control process 44 to locate 54 known tokens in the message. The list of tokens includes commands such as mount, other English words, such as please, in, on, for, volume, writing, reading, etc. and the names of the drive(s) 22. In addition to identifying known tokens in the message, the position of the identified tokens, at least relative to the other tokens, is also determined by the parsing process 52. Using the locations of the known and unknown tokens, rules are applied 56 to attempt to identify the message type. If the rules applied 56 indicate that the message is valid 58, robot control is executed 60 in accordance with the message; otherwise, the message is sent 62 to the operator (or discarded).

The steps of applying 56 the rules to identify message type, to determine 58 whether the message is valid and to transmit 60, 62 the message are illustrated in more detail in FIG. 5. There are several possible messages which may be received. Some additional examples will be discussed later, but the most important messages which request the mounting of a disk or other storage medium on the data storage device 22 are discussed below and illustrated in FIG. 5.

The first step in applying 56 rules to identify the message type is to compare 66 tokens located 54 in the message with known tokens required for a predefined message type, such as a mount message. The rules may include checking 68 that the tokens are received in the correct order. If the message requires input data, it is determined whether input data, i.e., an unknown token, was found 70 in the correct location. If any of the tests 66, 68, 70 fail, other rules are applied 72 to attempt to identify other message types. Assuming a mount message was received, a mount message type will be assigned 74. If another message type is identified 76, the appropriate message type will be assigned.

Further processing is determined 78 by the message type. If a mount message was assigned 74, the drive ID to be used and volume name to be mounted will be extracted 80 from the message. If only a single disk drive 22 is available in the jukebox device 20, a drive ID may not be included in the message. If a drive ID is included, the drive ID is checked 82 to verify that it is valid. If the drive ID is valid, instructions are transmitted 84 from the operator message interception process 40 (FIG. 1) to the robot control process 44 via the two-way mailbox 46. The instructions transmitted 84 to the robot control process 44 may require only a single transmission or a set of instructions may be transmitted one instruction at a time. If a valid drive ID is not located when the system requires a drive ID or no message type is identified 76, the message is sent 62 to the operator. In the case of the mount command, the mount command with an invalid drive ID may be a request for the operator to mount a tape on a tape drive. However, in a system in which the only valid mount commands are to the jukebox device 20, instead of sending the message to the operator the message may be discarded and an error sent to the requester.

A message very similar to the mount message may be generated by backup programs. Typically, such backup programs begin by issuing a mount message for the first volume in a sequence. Subsequent messages may include only a volume sequence number as input data. These types of messages are identified as the BACKUP type of message in the output from the selection procedure 78. When such a message is received, the volume sequence number is extracted 86 and a volume name is formed 88 from the volume name used by the initially transmitted mount request and the volume sequence number. This volume name is then used to transmit 84 instructions to select and mount the volume as in a typical mount request. This final step may be shared as illustrated in FIG. 5 or may be separate, if there are other special requirements for backup commands.

Other message types which might be intercepted by the operator message interception process 40 are represented by OTHER in FIG. 5. When one of these message types is identified in the selection process 78, corresponding instructions are transmitted 90 to the robot control process 44. These message types may include data storage request formats.

Five examples of data storage request formats will be given. A file operation format is used for requests to perform operations on files such as creating, copying, deleting and renaming. To enable such operations to be performed, the robot control process 44 or the operator message interception process 40 may have access to a database containing all directories on the volumes stored in unit 24. A second type of data storage request format is used for volume operations on a single volume of storage media including operations such as loading, mounting and cataloging volumes. A third type of data storage request format is used to resolve drive contention, thus controlling the use of the disk drive 22 by reserving or releasing the drive 22. A fourth type of data storage request format is a special message format which indicates that the input data is to be directly transmitted to the jukebox device 20. This format allows instructions to be transmitted in the language of the robot control device to control disk selection, etc. in unit 24 when the instructions were not previously stored 48 and associated with another message type.

Finally, the data storage request formats processed in step 90 may include requests to send maintenance instructions controlling the availability of the disks. Such instructions may include add or remove one or more volumes from the disk storage unit 24 and eject a volume from the disk drive 22. For example, some jukebox devices currently available include the ability to add and remove packs of volumes or individual volumes and this last type of command can be used for controlling such operations on the part of the disk storage and selection unit 24.

These five data storage request formats may be similar to the mount or backup message formats. Preferably, they start with a keyword that is unlikely to be present in other messages to the operator to help in distinguishing from conventional mount and backup messages or other messages that may be transmitted to the operator in a "chat" mode.

Alternatives to the use of mailboxes or message queues include using shared memory, a pseudo device or a disk file. Any of these commonly used techniques for communicating between programs could be used, for example, if the operating system's mailboxes are too small or otherwise unable to handle the message needed to be transmitted. These techniques could be used in conjunction with a mailbox or message queue by transmitting a short message identifying another location, e.g., in shared memory or a disk file, where the message to be transmitted to the robot control process 44 is located. The short message would be intercepted by the operator message interception process 40. The remainder of the message could then be read by either the operator message interception process 40, or the robot control process 44 by passing the location of the remainder of the message to the robot control process 44. Similarly, signals in UNIX or other operating systems could be used to indicate that a message is to be transmitted to the robot control process 44 and a message could be read from shared memory, a disk file or a similar storage location.

The many features and advantages of the present invention are apparent from the detailed specification, and thus it is intended by the appended claims to cover all such features and advantages of the system which fall within the true spirit and scope of the invention. Further, since numerous modifications and changes will readily occur to those skilled in the art from the disclosure of this invention, it is not desired to limit the invention to the exact construction and operation illustrated and described, accordingly, suitable modifications and equivalents may be resorted to, all falling within the scope and spirit of the invention.

What is claimed is:

1. A method for controlling access by a computer to storage media accessible via storage device, said method comprising the steps of:

(a) requesting access to the data via the storage device by transmitting a message in a general format directed to an operator of the computer;

(b) parsing the message transmitted in step (a) to separate the message into tokens and obtain position information for the tokens;

(c) identifying any known tokens in the tokens parsed in step (b) by comparison with a list of known tokens;

(d) applying rules for identifying a mount command for volumes of the data storage media for access by the storage device, in dependence upon said identifying in step (c) and the position information obtained in step (b);

(e) identifying a volume to be mounted when the mount command is identified in step (d);

(f) storing a set of instructions for a robot control device to select and mount the volume identified in step from among a group of the volumes; and (g) transmitting the set of instructions for controlling the robot control device with input data to select and mount the volume when the mount command and volume are identified in steps (d) and (e) and the input data does not request an invalid data storage device.

2. A method as recited in claim 1, wherein said applying in step (d) further comprises applying rules for identifying a backup command, wherein said identifying in step (e) includes identifying a volume sequence number when the backup command is identified in step (b), wherein said method further comprises the step of (h) forming a volume name from the volume sequence number identified in step (e) for the backup command and a previously identified volume name in a mount command, and wherein said transmitting in step (g) comprises transmitting the set of instructions for mounting the volume with the volume name formed in step (h).

3. A method for controlling access by a computer to storage media accessible via a storage device, said method comprising the steps of:

(a) requesting access to the data via the storage device by transmitting a message in a general format directed to an operator of the computer;

(b) parsing the message transmitted in step (a) to separate the message into tokens and obtain position information for the tokens;

(c) identifying any known tokens in the tokens parsed in step (b) by comparison with a list of known tokens;

(d) applying rules for identifying at least five data storage request formats requesting access to files stored on the storage media accessible via the storage device, in dependence upon said identifying in step (c) and the position information obtained in step (b), the rules including:

(1) a file operation format to perform at least one of creating, copying, deleting and renaming of files;

(2) a volume operation format for performing operations on single volumes of the storage media including at least one of loading, mounting and cataloging volumes;

(3) a drive contention format for controlling use of the data storage device, including at least one of reserving and releasing the data storage device;

(4) a pass through format for transmitting instructions in a language understandable by the data storage device; and (5) a maintenance format for controlling availability of the storage media, including at least one of add volume, remove volume from availability and eject volume from the data storage device.

* * * * *